US005503753A

United States Patent [19]
Woodall et al.

[11] Patent Number: 5,503,753
[45] Date of Patent: Apr. 2, 1996

[54] APPARATUS AND METHOD FOR COLLECTING AND DEWATERING THE CONTENTS OF SANITARY SEWER TRAPS

[75] Inventors: George W. Woodall, Cary; Damon W. Woodall, Fuquay-Varina, both of N.C.

[73] Assignee: Wallace Woodall Vacuum Pumping Service, Inc., Cary, N.C.

[21] Appl. No.: 396,573

[22] Filed: Mar. 1, 1995

[51] Int. Cl.$^6$ ................................................ B01D 21/02
[52] U.S. Cl. ............................ 210/803; 210/241; 210/521; 210/532.1; 210/258
[58] Field of Search ..................... 210/241, 258, 210/259, 579, 521, 532.1, 532.2, 803

[56] References Cited

U.S. PATENT DOCUMENTS

| | | | |
|---|---|---|---|
| 1,485,623 | 3/1924 | Mayo | 210/532.2 |
| 1,638,869 | 8/1927 | Moss | 210/532.2 |
| 2,367,270 | 1/1945 | Evans et al. | 210/532.2 |
| 2,664,911 | 1/1954 | Thompson et al. | 137/205 |
| 2,782,929 | 2/1957 | Colket | 210/532.1 |
| 3,460,677 | 8/1969 | Fifer | 210/521 |
| 3,463,172 | 8/1969 | Naylor | 210/521 |
| 4,200,535 | 4/1980 | Kennedy, Jr. | 210/241 |
| 4,213,479 | 7/1980 | Pearson | 137/493 |
| 4,389,314 | 6/1983 | Petretti | 210/241 |
| 4,436,622 | 3/1984 | Petretti | 210/232 |
| 4,543,183 | 9/1985 | Petretti | 210/187 |
| 4,816,167 | 3/1989 | Vanderslice | 210/776 |
| 4,997,562 | 3/1991 | Warner | 210/259 |
| 5,073,261 | 12/1991 | Conradi et al. | 210/521 |

Primary Examiner—Christopher Upton
Attorney, Agent, or Firm—Olive & Olive

[57] ABSTRACT

The present invention provides an apparatus and method for dewatering waste that has been collected in a sewer trap built into a tiltably mounted tank which is divided into two main chambers divided into a number of compartments. A pump is selectly connected to each main chamber to impose a pressurized atmosphere or a partial vacuum. An entry pipe connects to a suction hose outside the tank and to the first main compartment on the inside. Barriers in one main chamber are sealingly connected to the interior tank wall around the top potion and have hinged plates at a second potion. Barriers in the second main chamber are solid and sealed to the interior tank wall. A group of return pipes are adapted to return dewatered waste from the second to the first chamber and the cleaned water to the sewer line. The method taught involves drawing waste from a sewer trap into the first chamber of the tank by vacuum through the entry pipe. When a quantity of waste is in the first chamber, the tank is tilted to force the solids to a corner, after which the relatively clean water is moved to the second chamber. The increasing volume of liquid migrates in the second chamber to a last compartment where the residual water is substantially clean. The residual solids at the bottom of each compartment in the second chamber are returned to the first chamber and the cleaned water is returned to the sewer line.

13 Claims, 9 Drawing Sheets

5,503,753

APPARATUS AND METHOD FOR COLLECTING AND DEWATERING THE CONTENTS OF SANITARY SEWER TRAPS

FIELD OF THE INVENTION

This invention relates to waste treatment systems, and more particularly to systems for dewatering the contents of sanitary sewer traps.

BACKGROUND OF THE INVENTION

Waste products, including those waste products resulting from the preparation of food in restaurants, are frequently flushed down a drain pipe with water. Such restaurants typically collect much of these waste products in a trap intended to prevent the waste products from passing directly into a public sewage system. These accumulated waste products have been collected from the restaurant by service vehicles equipped with vacuum systems. U.S. Pat. No. 4,816,167 to Vanderslice for a Portable System For Dewatering Contents Of Sanitary Sewer Traps teaches a system for processing such waste products. The teachings of U.S. Pat. No. 4,816,167 are incorporated herein by reference. The present invention provides an improved apparatus and method directed to collecting the waste, dewatering the solids, returning the cleaned water to the sewage system and disposing of the solid residue.

The Vanderslice patent teaches, as a first step, the practice of collecting the water-carried waste in a first compartment of a tank so that a portion of the solids sinks to the bottom of the tank. Next, the tank is tilted to move the solids to a remote section of the tank, and much of the water is removed to a second compartment by means of a pressure or vacuum applied through a transfer pipe. The second compartment is separated into sub-compartments by internal walls which each have a baffle tube connecting a prior sub-compartment to a latter sub-compartment to flow water at a selected height above the tank bottom so as to further separate the solids from the water. The separation is assisted by the addition of alum to the dirty water to promote the precipitation of solids, especially grease.

A drawback to the Vanderslice apparatus and method is that the water does not separate sufficiently from the solids to allow the residual water to be returned to the sewer system for conventional processing. A further drawback is that solids residue accumulates in the sub-compartments which require frequent cleaning. An additional drawback of the previous system is that the tank has to be cleaned at a special facility and can not be operated for a long period between such cleanings.

It is therefore an object of this invention to provide an apparatus and method for the collection and dewatering of waste products which causes the solids to be thoroughly separated from the water.

It is a further object of this invention to provide an apparatus and method for the collection and dewatering of waste which use results in producing water which has been sufficiently separated and cleaned so that the water may be reintroduced to the sanitary sewer lines.

It is an additional object of this invention to provide an apparatus and method for the collection and dewatering of waste which will allow long periods of operation between required cleaning of the interior of the tank.

Other objects and advantages will be more fully apparent from the following disclosure and appended claims.

SUMMARY OF THE INVENTION

The present invention provides a tank which may be mounted on a vehicle in a manner so that the tank may be tilted. The tank is separated into two main chambers, each of which is divided into compartments. The first chamber into which water-carried waste is drawn has upper barrier portions sealed to tank walls and lower barrier portions that are hingeably attached to the upper portions to swing in only one direction. A small passage exists between the swingable lower portions and the tank bottom and a vent opening passes through the upper portion. The second chamber is separated into compartments by solid separators which have tubes connecting one compartment to the next. The invention further incorporates a suction tube having an open end located near the bottom of each compartment of the second chamber. Each suction tube is connected so as to return a portion of the concentrated waste to the first chamber for further separation processing. Precipatative chemicals may be added to assist in the separation of solids from water. When the dewatering of solids is completed, the cleaned water is returned to the sanitary sewer system and the dewatered solids are disposed of in a landfill.

DETAILED DESCRIPTION OF THE INVENTION

Figure 1:
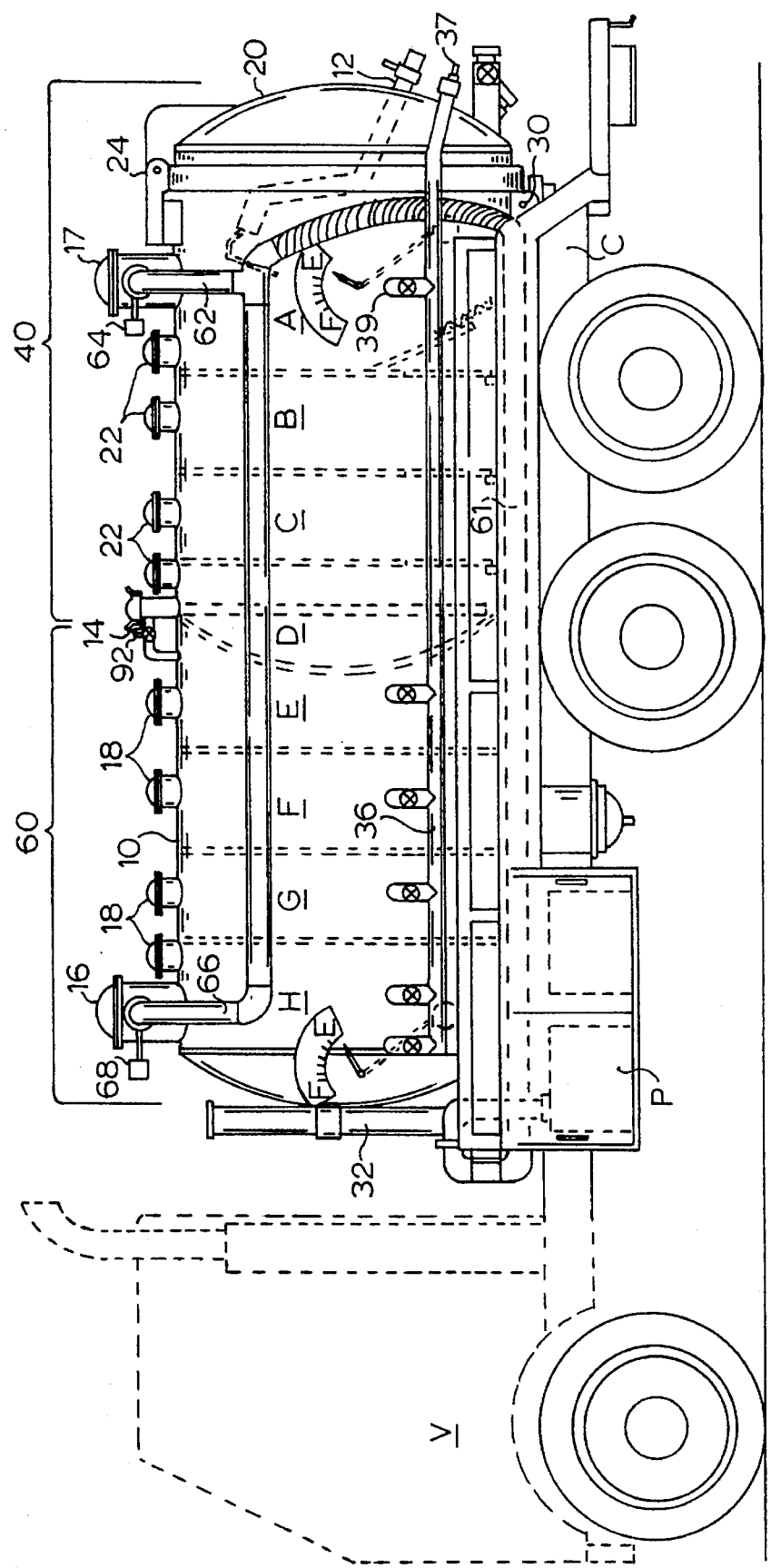
FIG. 1 is an elevation view of the left side of the tank apparatus of the invention mounted on a vehicle, the forward portion of which is illustrated in dashed lines.

Whereas the dewatering tank of the invention disclosed herein is useable in a fixed location, such as, for example, a sewage treatment plant, according to the preferred embodiment, the tank is mounted on a truck vehicle and thus is readily transportable. A typical mounting for tank 10 of the invention to a truck V is illustrated in FIG. 1. Tank 10 is connected at a rear portion thereof by means of pivot 30 to truck chasis C. A hydraulic cylinder 32 (see FIG. 2) is connected so as to be able to lift the front of the tank so as to tilt the tank with respect to the truck.

Tank 10 has an openable rear door 20 suspended from hinge 24 at its top extremity and clamped by appropriate means (not shown) when shut. Door 20 is sealed against leakage, when closed, by a perimeter gasket (not shown). Tank 10 is divided into two chambers 40 and 60, discussed below, connected by crossover pipe 14. Vent 16 is connected to forward chamber 60 and vent 17 is connected to rear chamber 40 of tank 10 to permit atmospheric pressure equalization, when open. Front access covers 18 and rear access covers 22 permit an operator to view various portions of the interior of tank 10 as needed.

Figure 2:
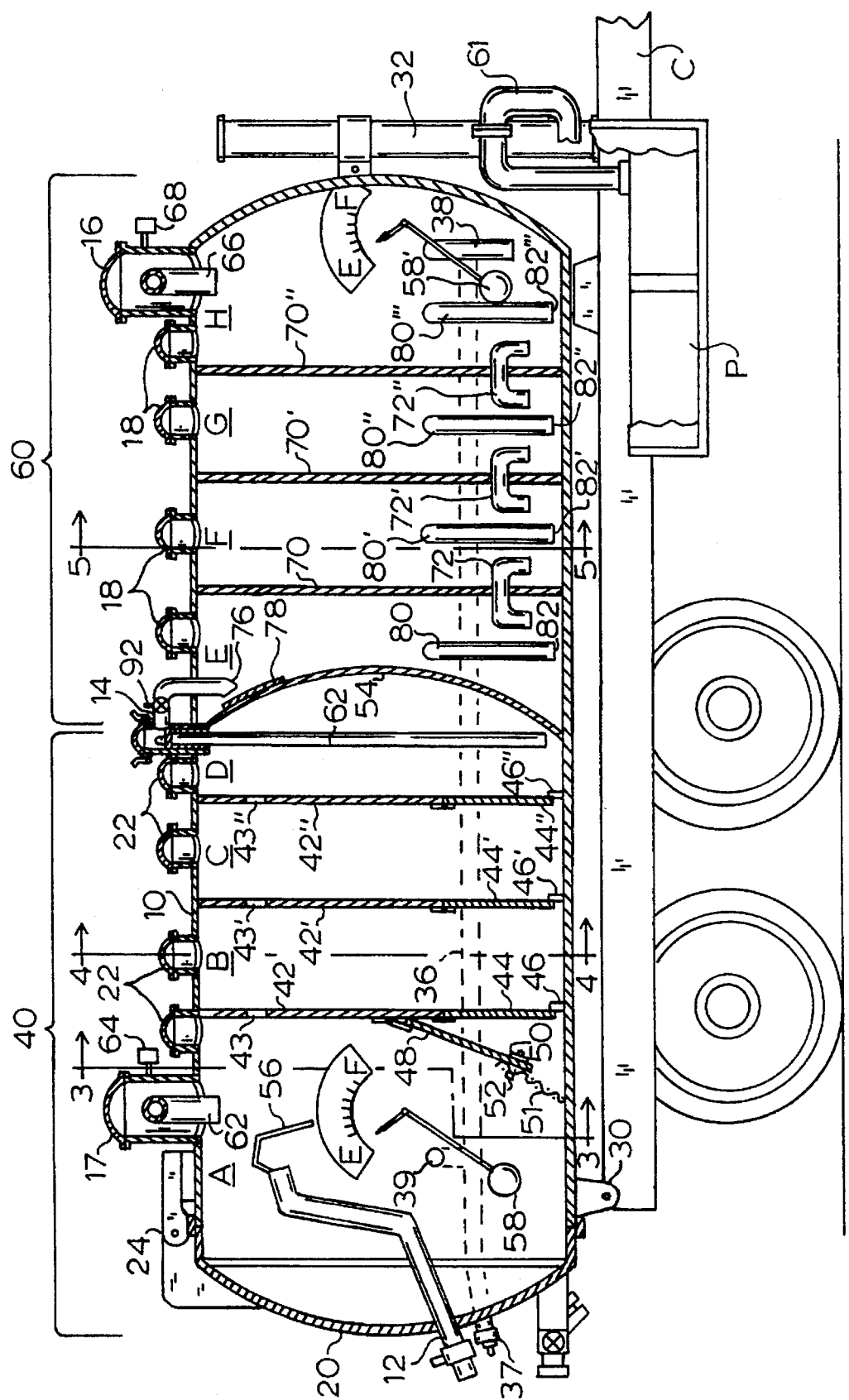
FIG. 2 is a cross sectional longitudinal view of the tank of FIG. 1 shown from the opposite side for illustrative purposes.

During the processing of waste as disclosed herein, quantities of concentrated waste or relatively clean water are transferred by return line 36 (FIGS. 1 and 2). The force for transfer of liquid into tank 10 and between portions of tank 10 is provided by pump P, which is adapted to generate either a positive or negative pressure as required. Pump P is connected by pump line 61 (FIG. 1), which divides to rear line 62 connecting to rear chamber 40 through valve 64 and front line 66 to front chamber 60 through valve 68, respectively, each such valve being remotely operated by conventional means.

Figure 3:
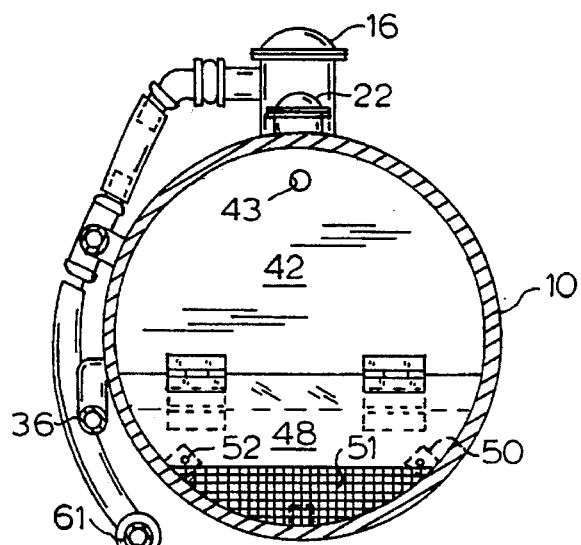
FIG. 3 is a full cross sectional view of the tank taken in the direction of line 3—3 of FIG. 2.
Figure 4:
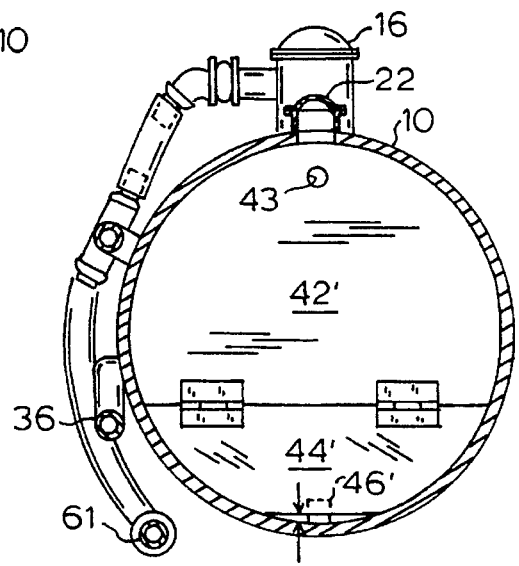
FIG. 4 is a full cross sectional view of the tank taken in the direction of line 4—4 of FIG. 2.

Details of the interior of tank 10 are illustrated in longitudinal cross section in FIG. 2, which is drawn from the opposite side compared to FIG. 1 to show the internal operative features of the tank. Tank 10 is separated into rear chamber 40 and front chamber 60 by divider wall 54, which is spherical in shape to withstand pressure. External intake pipe 12 connects to the interior of rear chamber 40 and is fitted with rigidly attached separator plate 56. Rear chamber 40 is divided into compartments A, B, C and D by a series of barriers 42, 42', 42", each formed as a partial disk sealingly connected at the upper portion of its perimeter to the interior surface of tank 10. An elevation detail of typical barrier 42' is seen in FIG. 4. The description relating to barrier 42' is used as an example and pertains to barriers 42 and 42" also. A vent 43' (FIG. 4) connects adjacent compartments B and C through the upper segment of barrier 42'. Swing plate 44' is hingedly connected to the horizontal bottom edge of barrier 42'. When swing plate 44' hangs vertically in contact with stop 46', gap G of approximately one inch remains open between the bottom straight edge 45' of swing plate 44' and the lowest point of tank 10, in the preferred embodiment. Stop 46' comprises an upright bar secured to tank 10 and prevents swing plate 44' from swinging forwardly (counterclockwise in FIG. 2), while allowing it to swing rearwardly. Rearmost barrier 42, shown in rear elevation in FIG. 3 and side elevation in FIG. 2, also has deflector plate 48 hingedly connected thereto in addition to swing plate 44. Deflector plate 48 is hingedly connected to barrier 42 at a height above the height at which swing plate 44 is connected, and is releasably attachable to anchors 50 by means of screws 52. Deflector plate 48 also has a horizontal straight bottom edge 49 which resides approximately 6 inches above the lowest point of tank 10 when deflector plate 48 is attached to anchors 50. Grid 51 is attached parallel to and in contact with deflector plate 48 at its bottom edge 49 to block the space from the bottom edge of deflector plate 48 to the inner bottom surface of tank 10.

Returning to FIG. 2, compartment A is larger than the other compartments to allow sufficient space for accumulation of solids therein and the movement of floating fullness indicator 58. Fullness indicators 58 and 58' are provided in main chamber 40 and 60 respectively and each includes a float and an external dial gauge. Compartment D contains inlet tube 62 of crossover pipe 14, terminating approximately 4–6 inches above the bottom of tank 10.

Figure 5:
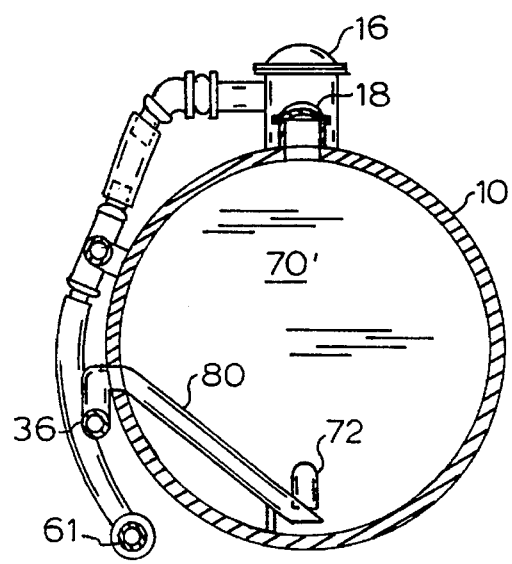
FIG. 5 is a full cross sectional view of the tank taken in the direction of line 5—5 of FIG. 2.

Forward chamber 60 contains compartments E, F, G and H with compartment H, containing fullness indicator 58', being somewhat larger than the others. The compartments in forward chamber 60 are separated by equal size disks 70, 70', 70". Disks 70, 70', 70" are solid and continuous except for each being breached by tubes 72, 72', 72". Tube 72', being typical, is sealingly connected to disk 70', shown in FIG. 5, by welding about 12 inches above the bottom of tank 10 and directed downward on each side to terminate at about 4–6 inches thereabove. Each of compartments E, F, G, H are provided with a respective sludge return pipe 80, 80', 80", 80''' with a pickup mouth 82 positioned within one inch of the lowest portion of tank 10. Each sludge return pipe 80 is connected through a valve 81 to return line 36 (see FIG. 1), located external to tank 10. Water return pipe 38 is positioned in compartment H with its lower end 6–8 inches above the bottom of tank 10 and its upper end connected to return line 36 by a valve 83 (see FIG. 1). Return line 36 is connected to compartment A through a valve 39 and continues to a terminal valve and nozzle 37 (FIG. 1) for discharging outside of tank 10.

Figure 6:
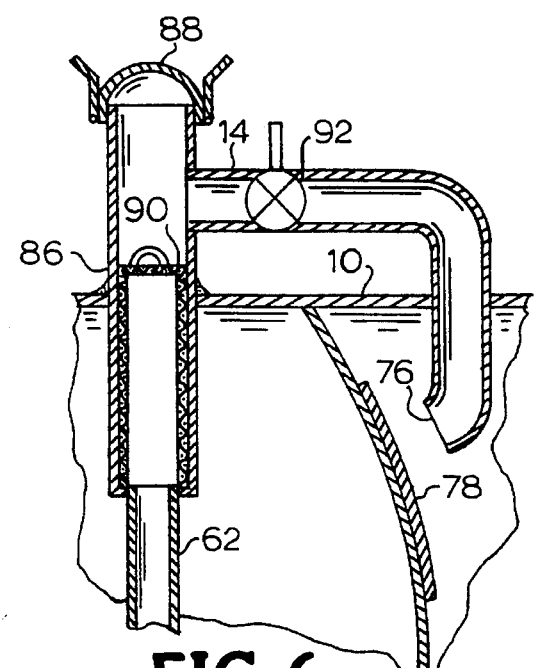
FIG. 6 is an enlarged cross sectional view of the filter and valve portion of the crossover pipe.

Crossover pipe 14 ends in compartment E (see FIG. 2) with an inwardly turned discharge mouth 76 to discharge its contents in pressurized flow against splash plate 78, removably attached to wall 54 so as to be replaceable when damaged by wear. FIG. 6 illustrates the center portion of crossover pipe 14 in enlarged detail. The upper end of inlet tube 62 is sealed to filter housing 86, which is adapted to contain filter 90. Filter 90 is formed as an inverted mesh basket with a diameter greater than the internal diameter of inlet tube 62. A removable cover 88 seals the open top of filter housing 86. Crossover pipe 14 is fitted to a side surface of filter housing 86 to allow flow of liquid through remotely controlled valve 92 to exit at discharge 76.

Figure 7:
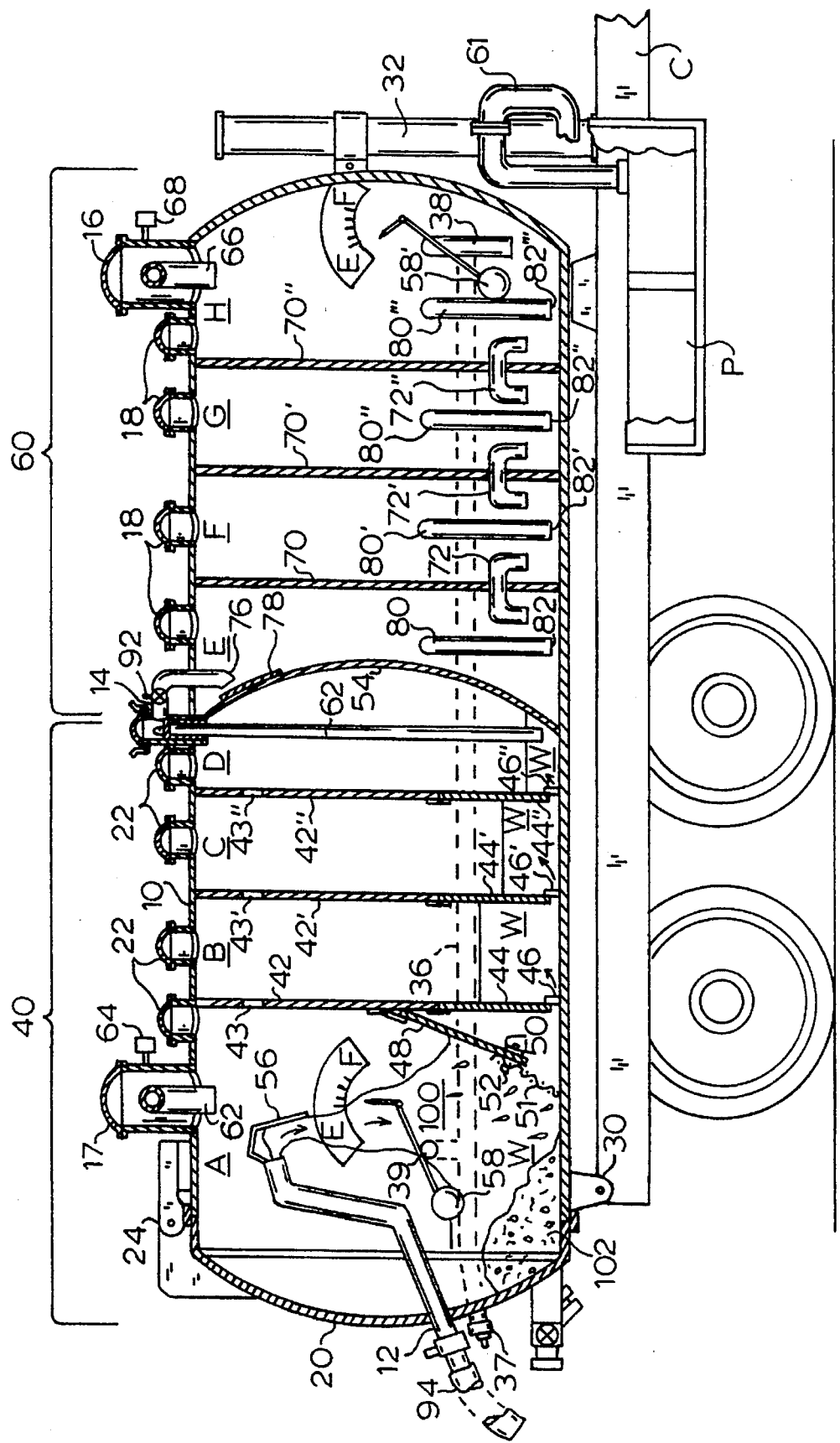
FIG. 7 is a further view of the cross section of FIG. 2 during the filling of a first compartment of the tank of the invention.
Figure 8:
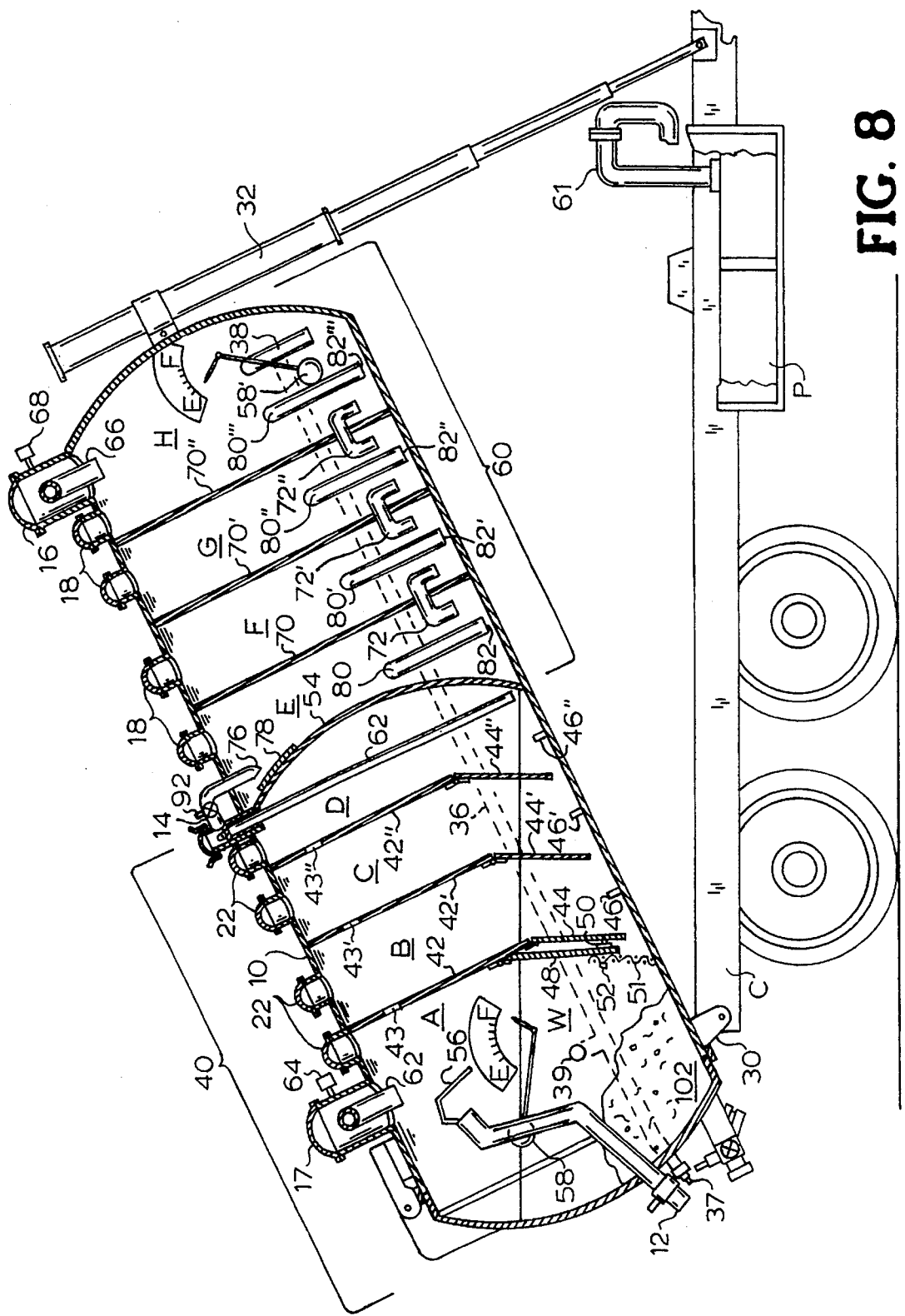
FIG. 8 is a cross sectional view of the tank of the invention in a tilted orientation to compact the solid waste beneath the water collected.

Operation of tank 10, according to the method of the invention, is portrayed in FIGS. 7–12. In the first process step, suction hose 94 is connected to intake pipe 12 at one end, with the other end inserted into a sewage trap (not shown) to be cleaned. Pump P is connected through rear line 62 and valve 64 to chamber 40 (FIG. 7). Forward chamber valve 68 and crossover pipe valve 92 are each closed. As pump P is activated in vacuum mode, the collected waste materials 100 are drawn from the sewage trap into rearmost compartment A, and are dispersed by separator plate 56. Waste material 100, the flow pattern of which is shown by arrows, contacts deflector plate 48 and falls to the bottom of tank 10. By propelling waste material 100 against separator plate 56 and deflector plate 48, a portion of the contained solids 102 tends to separate from the water and fall into a pile. However, a percentage of solids remain suspended in the water W. As water W fills in compartment A, it gradually flows through the gap G beneath swing plate 44 to compartment B, thus the level of water in compartment B is temporarily lower than the level in compartment A. By forcing the water to pass slowly to each succeeding compartment A, B, C, D, additional solids in the water drop out of suspension.

Once the contents of the trap being cleaned are drawn into rear chamber 40 and the suspended solids are precipitated in compartments A, B, C, D, the level of water W will become equalized throughout rear compartment 40. Next, cylinder 32 is pressurized to lift the forward end of tank 10 (see FIG. 8), forcing solids 102 into the rear lower corner of tank 10 under the weight of water W.

Figure 9:
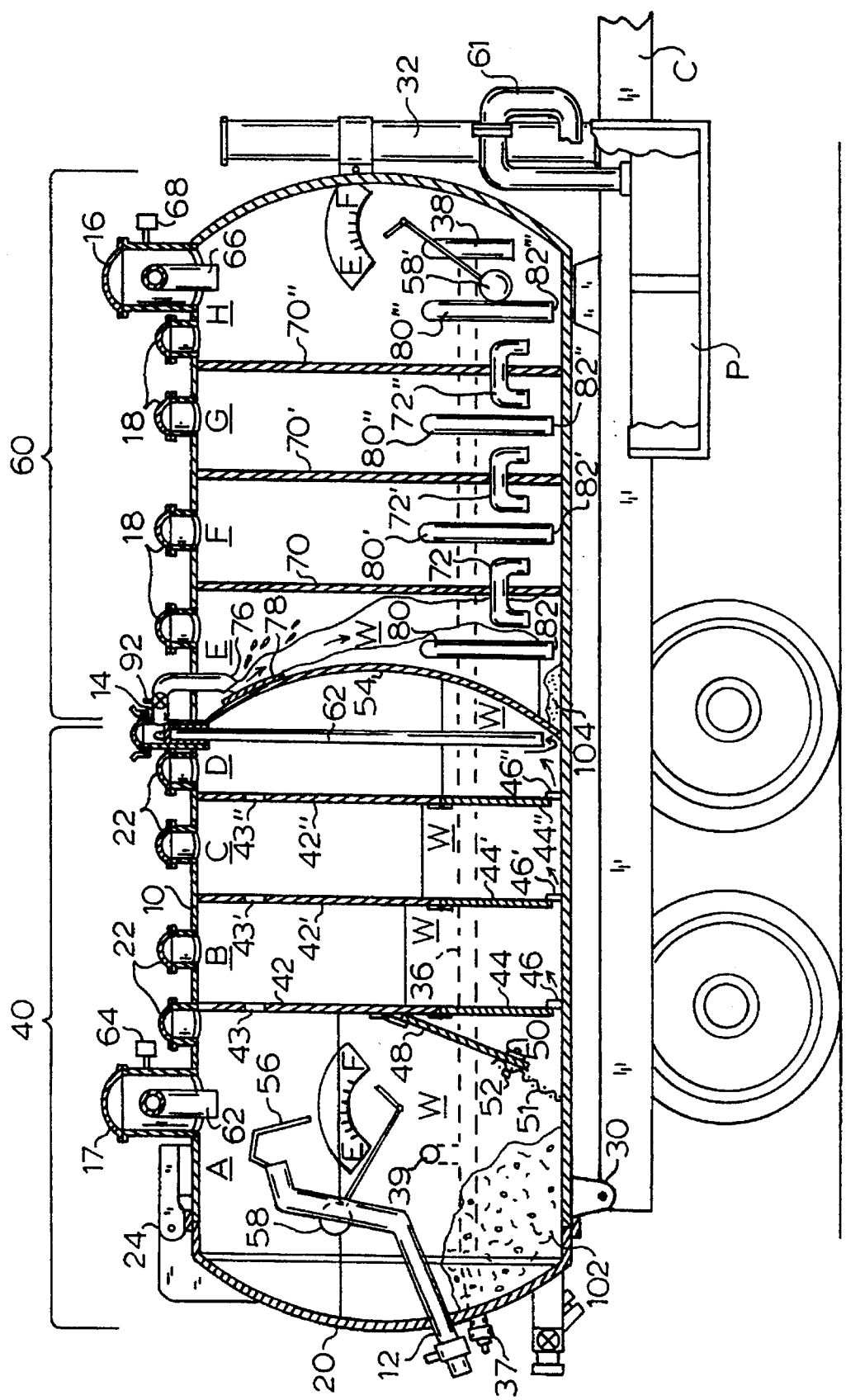
FIG. 9 is a cross sectional view of the tank of the invention in level orientation during the step of transferring water with some residual solids from the first to the second chamber.
Figure 10:
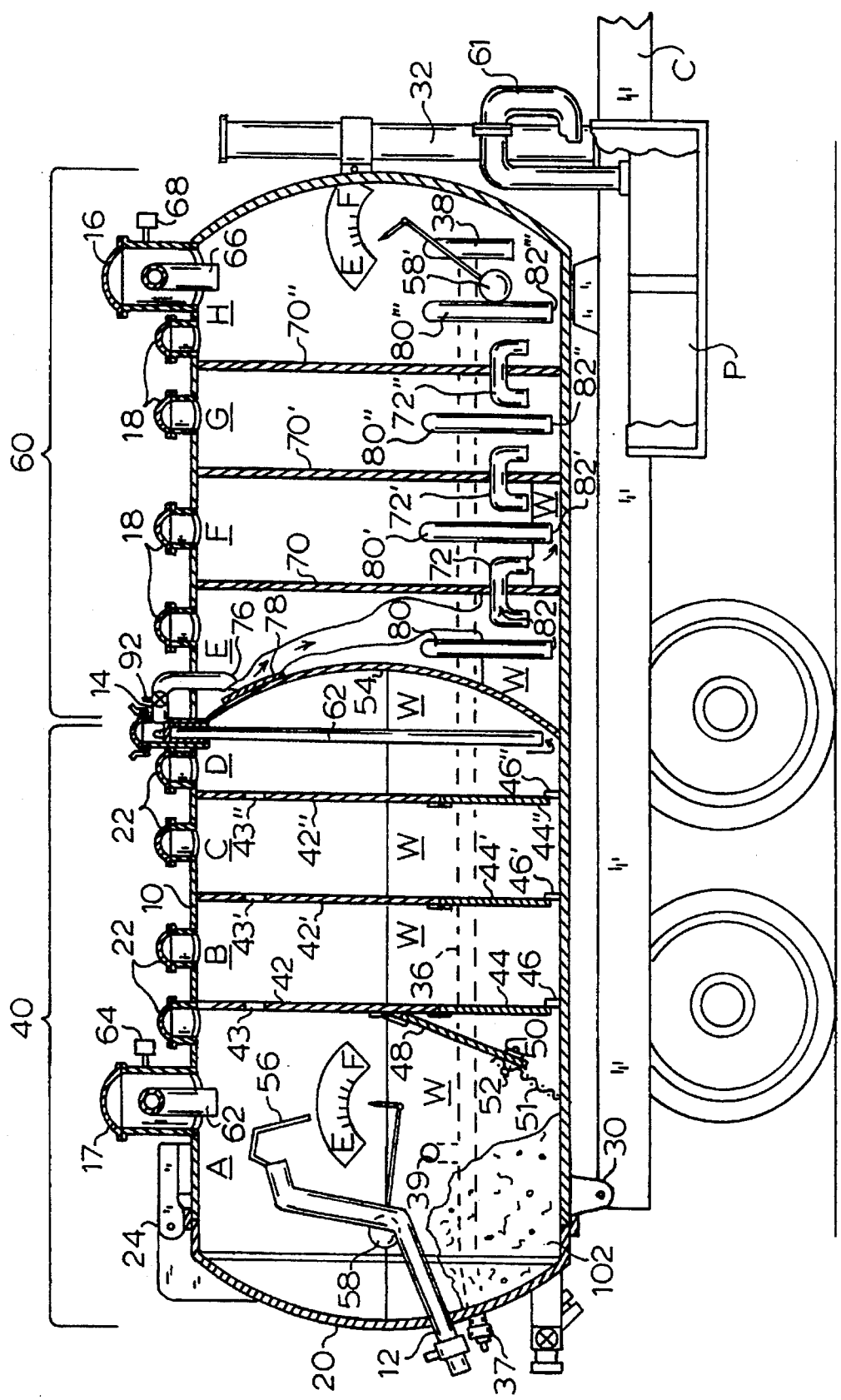
FIG. 10 is a cross sectional view of the tank of the invention in level orientation during the step of transferring water with some residual solids from a first compartment to a second compartment in the second chamber.

Cylinder 32 is then slowly deactivated, and tank 10 brought gradually down to a level condition, leaving solids 102 in a mass in the rear corner of tank 10 as shown in FIG. 9. Water W will begin to resume a horizontal level surface condition throughout compartments A, B, C D. Although most of the solids 102 have been precipitated from water W, a lesser quantity of solids still remains suspended. As tank 10 is gradually returned to level, crossover valve 92 (FIG. 9) is opened and front vent 16 is closed to enable the transfer of liquid from rear chamber 40 to front chamber 60. Referring to FIG. 10, rear compartment valve 64 is closed, rear vent 17 is opened, front compartment valve 68 is opened and pump P is operated in vacuum mode to draw water W through crossover pipe 14 from rear chamber 40 to compartment E of front chamber 60. The liquid drawn through crossover pipe 14 is sprayed under pressure from pipe discharge 76 against splash plate 78, further causing solid particles in water W to drop out of suspension. As a quantity of water W fills into compartment E, it begins to flow through tube 72 to compartment F. Since the respective tubes 72 in between each compartment E, F, G, H are positioned above the bottom of tank 10 by 4–6 inches, any solids which tended to precipitate will remain behind in each successive compartment until the water reaching compartment H is substantially clean.

In the next step, vent 16 and valve 92 are closed, isolating chamber 60, valve 68 is opened, and pump P is operated in its positive pressure mode. The excess quantity of substantially clean water in compartment H is now removed from tank 10 through water return pipe 38 by means of positive pressure from pump P applied to chamber 60 per FIG. 11. Normally, the water removed from compartment H is returned to the sanitary sewer via return pipe 36.

Figure 11:
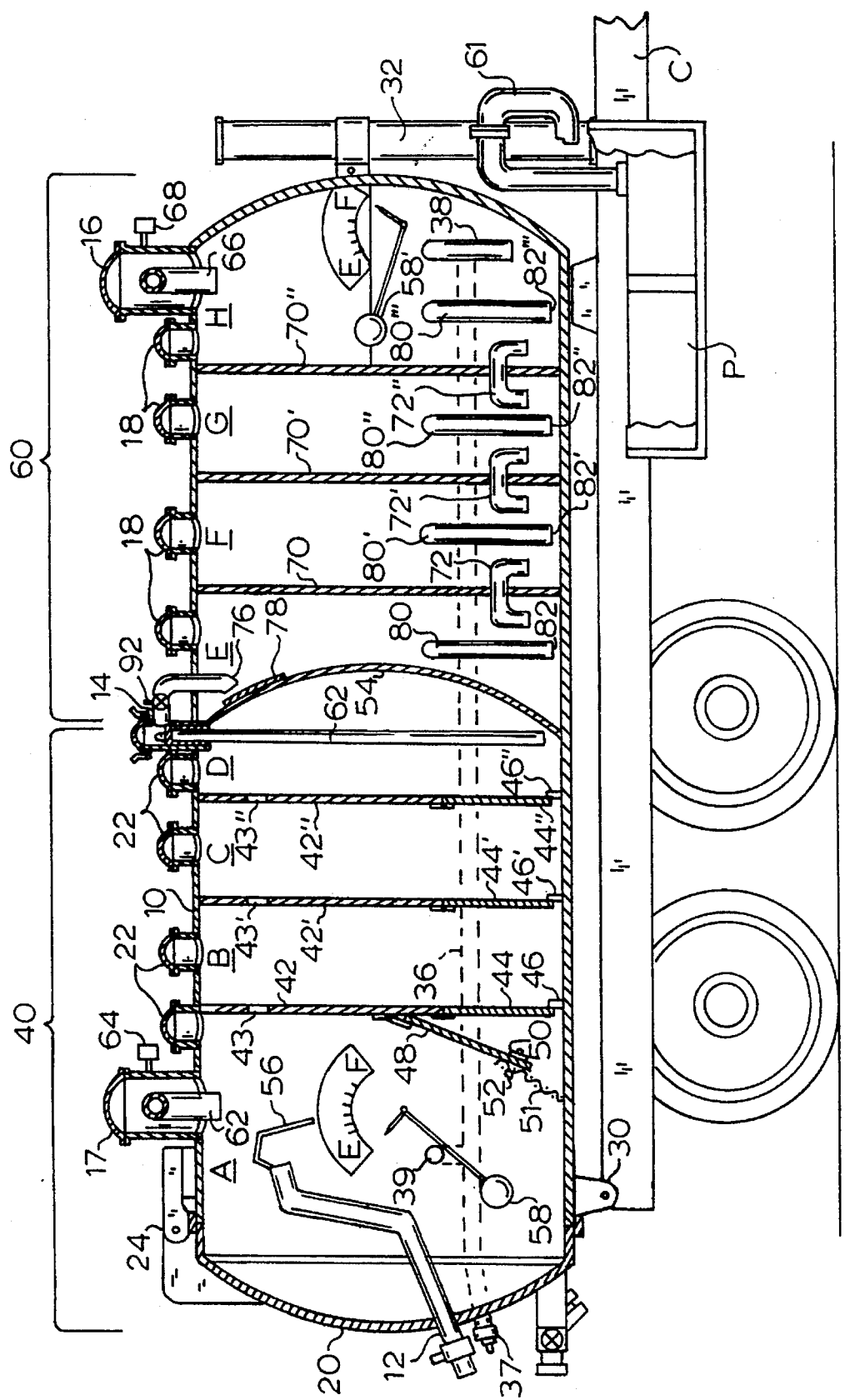
FIG. 11 is a cross sectional view of the tank of the invention in level orientation during the step of transferring some concentrated residual solids from the forward compartments to the first chamber.

Continuing with FIG. 11, the valves connecting each sludge pipe 80, in respective compartments E, F, G, H to return line 36, are opened. With vent 16 and valve 92 closed and valve 68 open, pump P is operated in its positive pressure mode to return the sludge 102, or partially dewatered solids, through valve 39 to compartment A for continued processing.

Figure 12:
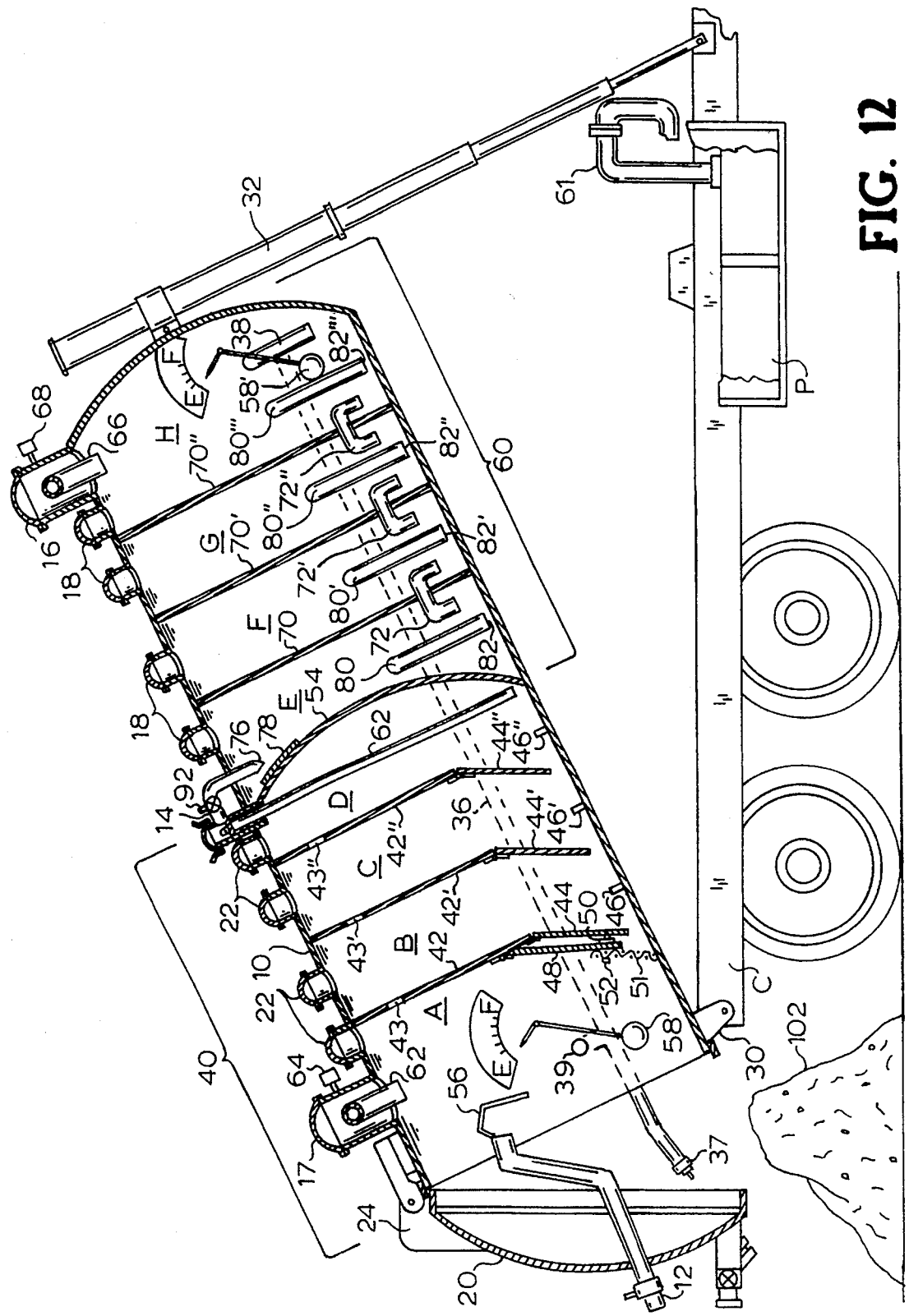
FIG. 12 is a cross sectional view of the tank of the invention in tilted orientation with its rear door open to allow the removal of the compacted, dewatered solid waste.

The final step in the process is to remove the dewatered sludge to a disposal facility from tank 10 when there is substantially no water remaining in chamber 40. To accomplish this step, door 20 is released and cylinder 32 is pressurized to raise the forward portion of tank 10, as illustrated in FIG. 12. As the front of tank 10 rises, rear door 20 falls open and a portion of sludge 102 drops out. Each of swing plates 44, 44' and 44" also fall rearward, but without major effect as to the removal of solids. To thoroughly clean the bottom of tank 10, a tool, such as a shovel or hoe, may be used to draw out the residual solids. Cylinder 32 is deactivated, tank 10 is brought back to level, and door 20 refastened. Tank 10 is in condition to begin the process anew.

While the invention has been described with reference to specific embodiments thereof, it will be appreciated that numerous variations, modifications, and embodiments are possible, and accordingly, all such variations, modifications, and embodiments are to be regarded as being within the spirit and scope of the invention.

What is claimed is:

1. An apparatus for dewatering the contents of sewer traps, comprising:
   (a) a first chamber divided into a plurality of compartments which are each separated from the other by an internal barrier in sealed relation with the interior of said first chamber and terminating above the lowest point of said chamber so as to define a passage between adjacent compartments;
   (b) a second chamber divided into a plurality of compartments which are each separated from the other by an internal barrier in sealed relation with the interior of said second chamber;
   (c) a crossover pipe having a first branch in fluid communication with said first chamber and a second branch in fluid communication with said second chamber and a valve therebetween;
   (d) an upper portion of each said internal barrier in said first chamber having a vent opening passing therethrough;
   (e) each said internal barrier in said second chamber having a tube passing therethrough to connect from a first to a second of said compartments separated by each said barrier:
   (f) an air pump in valve controlled fluid communication with said first chamber and in valve controlled fluid communication with said second chamber;
   (g) an entry pipe adapted to convey the contents of sewer traps into said first chamber; and
   (h) a valve controlled vent in fluid communication with said second chamber.

2. The apparatus for dewatering the contents of sewer traps as claimed in claim 1, wherein each said internal barrier for dividing said first chamber into a plurality of compartments comprises a fixed upper portion in sealed relation with the interior of said chamber and a lower portion hingedly attached to said upper portion so as to be swingable within said chamber.

3. The apparatus for dewatering the contents of sewer traps as claimed in claim 2, further comprising stop means positioned so as to allow said hingedly attached lower portion to swing only in one direction relative to the plane of said fixed upper portion.

4. The apparatus for dewatering the contents of sewer traps as claimed in claim 2, further comprising a deflector plate mounted in said first chamber so as to deflect the contents of sewer traps being conveyed into said first chamber through said entry pipe.

5. The apparatus for dewatering the contents of sewer traps as claimed in claim 4, further comprising a grid connected in parallel relation to a lower end of said deflector plate.

6. The apparatus for dewatering the contents of sewer traps as claimed in claim 1, further comprising a plate fixedly mounted adjacent an end of said entry pipe within said first chamber in a position so that materials flowing through said entry pipe impinge on said plate.

7. The apparatus for dewatering the contents of sewer traps as claimed in claim 1, further comprising a plurality of sludge return pipes, each of which is positioned with an open end adjacent a low point in each said compartment in said second chamber and connected at a second end to a return line connected to said first chamber.

8. The apparatus for dewatering the contents of sewer traps as claimed in claim 1, further comprising a plate positioned opposite to the mouth of the branch of said crossover pipe in communication with said second chamber so that materials flowing through said crossover pipe impinge said plate.

9. The apparatus for dewatering the contents of sewer traps as claimed in claim 1, further comprising means to raise said second chamber to a level above the level of said first chamber.

10. The apparatus for dewatering the contents of sewer traps as claimed in claim 1, further comprising means to remove water from said second chamber.

11. The apparatus for dewatering the contents of sewer traps as claimed in claim 1, further comprising means to remove a dewatered waste residue from said first chamber.

12. The apparatus for dewatering the contents of sewer traps as claimed in claim 1, further comprising means to tiltably mount said apparatus on a vehicle so as to be portable.

13. A method for dewatering the contents of sewer traps comprising the steps of:

(a) transferring a portion of the contents of said sewer trap to a first chamber having a plurality of compartments separated from each other by barriers, the upper portions of which are sealed to said chamber and the lower portions of which are hingedly attached to said upper portions respectively such that said sewer trap contents impinge against at least one fixed surface and partially separate into a solids component and a liquid component;

(b) causing a portion of said liquid component to transfer from said first chamber to a second chamber having a plurality of compartments separated from each other by barriers fixedly attached to said second chamber and said barriers having openings passing therethrough so that said liquid component further separates to precipitate solids remaining therein;

(c) transferring said precipitated solids from said second chamber to said first chamber;

(d) transferring a significant portion of said liquid component to a sanitary sewer after precipitating additional solids; and (e) removing said solids component from said first chamber.

* * * * *

UNITED STATES PATENT AND TRADEMARK OFFICE
CERTIFICATE OF CORRECTION

PATENT NO. : 5,503,753
DATED : April 2, 1996
INVENTOR(S) : George W. Woodall and Damon W. Woodall It is certified that error appears in the above-indentified patent and that said Letters Patent is hereby corrected as shown below:

Column 1, line 38, Correct "latter" to read --later--.

Column 4, line 7, delete "thereabove" and substitute --above the bottom of tank 10--.

Column 5, line 24, correct "remain" to read --remains--.

Column 4, line 58, correct "fills" to read --flows--.

Signed and Sealed this

Twenty-second Day of October, 1996

Attest:

BRUCE LEHMAN

*Attesting Officer*          *Commissioner of Patents and Trademarks*